US012583799B2

(12) United States Patent
Honda

(10) Patent No.: US 12,583,799 B2
(45) Date of Patent: Mar. 24, 2026

(54) PARTITION MEMBER AND ASSEMBLED BATTERY

(71) Applicant: Mitsubishi Chemical Corporation, Chiyoda-ku (JP)

(72) Inventor: Tatsuhiko Honda, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/885,465

(22) Filed: May 28, 2020

(65) Prior Publication Data

US 2020/0290933 A1 Sep. 17, 2020

Related U.S. Application Data

(63) Continuation of application No. PCT/JP2018/044271, filed on Nov. 30, 2018.

(30) Foreign Application Priority Data

Nov. 30, 2017 (JP) ................................. 2017-231170

(51) Int. Cl.
| | |
|---|---|
| *H01M 10/613* | (2014.01) |
| *C04B 35/80* | (2006.01) |
| *H01M 10/625* | (2014.01) |
| *H01M 10/653* | (2014.01) |
| *H01M 10/6557* | (2014.01) |
| *H01M 10/6567* | (2014.01) |

(Continued)

(52) U.S. Cl.
CPC ........... *C04B 35/80* (2013.01); *H01M 10/613* (2015.04); *H01M 10/625* (2015.04); *H01M 10/653* (2015.04); *H01M 10/6557* (2015.04);

*H01M 10/6567* (2015.04); *H01M 10/6568* (2015.04); *H01M 10/658* (2015.04); *H01M 50/204* (2021.01); *H01M 50/293* (2021.01)

(58) Field of Classification Search
None
See application file for complete search history.

(56) References Cited

U.S. PATENT DOCUMENTS

| | | | | |
|---|---|---|---|---|
| 5,885,732 A | * | 3/1999 | Verhoog | .............. H01M 50/116 429/176 |
| 6,146,783 A | | 11/2000 | Brohm et al. | |

(Continued)

FOREIGN PATENT DOCUMENTS

| | | |
|---|---|---|
| CN | 103043998 A | 4/2013 |
| CN | 103339323 A | 10/2013 |

(Continued)

OTHER PUBLICATIONS

Inoue, JP-2011136859 machine translation (Year: 2011).*

(Continued)

*Primary Examiner* — Ula C Ruddock
*Assistant Examiner* — Anna Korovina
(74) *Attorney, Agent, or Firm* — Oblon, McClelland, Maier & Neustadt, L.L.P.

(57) ABSTRACT

A partition member that forms a partition between single batteries or between a single battery and a member other than the single battery. The partition member contains a thermal insulation material that contains a powdered inorganic material and a fibrous inorganic material and that has a density of 0.23 to 1.10 g/cm$^3$.

7 Claims, 6 Drawing Sheets

(51) Int. Cl.

| | |
|---|---|
| *H01M 10/6568* | (2014.01) |
| *H01M 10/658* | (2014.01) |
| *H01M 50/204* | (2021.01) |
| *H01M 50/293* | (2021.01) |

(56) References Cited

U.S. PATENT DOCUMENTS

| | | | |
|---|---|---|---|
| 2007/0292751 A1 | 12/2007 | Cherng et al. | |
| 2010/0136404 A1* | 6/2010 | Hermann ............ | H01M 10/647 |
| | | | 429/120 |
| 2011/0064983 A1* | 3/2011 | Yokoyama .......... | H04M 1/0262 |
| | | | 429/100 |
| 2011/0195291 A1* | 8/2011 | Yokoyama .......... | H01M 50/213 |
| | | | 429/99 |
| 2013/0344369 A1* | 12/2013 | Miyakawa ........ | H01M 10/6554 |
| | | | 429/120 |
| 2015/0064514 A1* | 3/2015 | Wu ..................... | H01M 50/293 |
| | | | 429/120 |
| 2016/0185068 A1* | 6/2016 | Shinohara ............ | F16L 59/065 |
| | | | 156/60 |
| 2017/0301965 A1 | 10/2017 | Kato et al. | |
| 2019/0006642 A1* | 1/2019 | Sakaguchi .......... | H01M 50/204 |
| 2019/0221902 A1* | 7/2019 | Kuboki ............ | H01M 10/6551 |
| 2020/0058972 A1 | 2/2020 | Kawai et al. | |

FOREIGN PATENT DOCUMENTS

| | | | | | |
|---|---|---|---|---|---|
| DE | 10 2014 008 000 A1 | | 11/2015 | | |
| DE | 102015007408 A1 | * | 12/2016 | | |
| EP | 3 598 566 A1 | | 1/2020 | | |
| JP | 2001-220258 A | | 8/2001 | | |
| JP | 2003-202099 A | | 7/2003 | | |
| JP | 2003-266572 A | | 9/2003 | | |
| JP | 2005-108750 A | | 4/2005 | | |
| JP | 2010-097693 A | | 4/2010 | | |
| JP | 2011-14540 A | | 1/2011 | | |
| JP | 2011136859 A | * | 7/2011 | | |
| JP | 2011-165390 A | | 8/2011 | | |
| JP | 2013-131428 A | | 7/2013 | | |
| JP | 2013-150392 A | | 8/2013 | | |
| JP | 2014-035043 A | | 2/2014 | | |
| JP | 2016-084836 A | | 5/2016 | | |
| WO | WO 2015/029381 A1 | | 3/2015 | | |
| WO | WO 2017/051648 A1 | | 3/2017 | | |
| WO | WO-2017083743 A1 | * | 5/2017 | ............ | H01M 10/39 |
| WO | WO-2017106524 A1 | * | 6/2017 | ............ | B32B 23/10 |
| WO | WO-2017159527 A1 | * | 9/2017 | ......... | H01M 10/613 |
| WO | WO-2018061761 A1 | * | 4/2018 | ............ | H01G 11/10 |

OTHER PUBLICATIONS

Welke et al., DE-102015007408 Machine Translation (Year: 2016).*

International Preliminary Report on Patentability and Written Opinion issued Jun. 2, 2020 in PCT/JP2018/044271 (submitting English translation only), 9 pages.

Extended European Search Report issued Nov. 20, 2020 in European Patent Application No. 18883501.1, 7 pages.

International Search Report issued Jan. 8, 2019 in PCT/JP2018/044271 filed on Nov. 30, 2018, 2 pages.

Indian Office Action issued Mar. 11, 2022 in Indian Patent Application No. 202047026916, 5 pages.

Office Action dated Jul. 19, 2022, issued in corresponding Japanese patent application No. 2019-556760 (with machine translation).

Combined Chinese Office Action and Search Report issued on Jan. 31, 2023 in Chinese Patent Application No. 201880076401.1 (with unedited computer-generated English translation), 17 pages.

Japanese Office Action issued on Mar. 7, 2023 in Japanese Patent Application No. 2019-556760 (with unedited computer-generated English translation), 9 pages.

Indian Hearing Notice issued in Indian Patent Application No. 202047026916 on Dec. 6, 2023 (w/ English translation).

Chinese Office Action issued Nov. 8, 2023 issued in Chinese Patent Application No. 201880076401.1, therein, 17 (with English Translation).

Chinese Office Action issued in Chinese Patent Application No. 201880076401.1 on Jun. 5, 2024, (w/ English translation).

European Office Action issued on Nov. 19, 2024 in European Patent Application No. 18 883 501.1, 7 pages.

Chinese Office Action issued on Dec. 17, 2024 in Chinese Patent Application No. 201880076401.1 (with English translation), 10 pages.

* cited by examiner

W(P)

D 210    220

200

W(P)

H

PARTITION MEMBER AND ASSEMBLED BATTERY

CROSS-REFERENCE TO RELATED APPLICATION

This application is a continuation application of International Application PCT/JP2018/044271 filed on Nov. 30, 2018 and designated the U.S., and this application is based upon and claims the benefit of priority of the prior Japanese Patent Application No. 2017-231170, filed on Nov. 30, 2017, the entire contents of which are incorporated herein by reference.

BACKGROUND

1. Field

The disclosure relates to a partition member and an assembled battery.

2. Description of the Related Art

The use of secondary batteries as power sources for vehicles and the like has grown dramatically in recent years. Studies are being conducted on further increasing the energy density of secondary batteries, for the purpose of, for instance, increasing the degree of freedom in mounting of a secondary battery in the limited space of a vehicle or the like, and extending the cruising range that can be covered with one charging. On the other hand, a tradeoff tends to arise in secondary batteries between safety and energy density, in that the higher the energy density of the secondary battery, the lower the safety of the battery tends to be. For instance, in secondary batteries mounted on electric vehicles with a cruising range of several hundred km, the surface temperature of the battery in the case of damage to the battery, for instance, due to overcharge or internal short-circuits, may exceed several hundred degrees C., and may reach about 1000° C.

Since a secondary battery used as a power supply of a vehicle or the like is generally used as an assembled battery made up of a plurality of unit batteries (hereinafter, also referred to as "cells"), when one of the unit batteries constituting the assembled battery is damaged and reaches the temperature range described above, there is a risk that the heat generation may damage adjacent unit batteries and the damage may spread in a chain reaction across the entire assembled battery. In order to prevent such a chain of damage among unit batteries, various techniques are being proposed, including providing a partition member between one unit battery and another to quickly move heat from a unit battery at which abnormal heat generation had occurred to a nearby unit battery and to cool a damaged unit battery.

For example, in order to cool a battery that generates an abnormal amount of heat, there exists a cooler-equipped battery in which a secondary battery is arranged so as to be in contact with a cooling container in which a film-like porous body and a cooling liquid are sealed (for example, see PTL 1). In addition, there exists a power storage device in which a partition member, which has a spacer formed from a thermosetting resin and a base material formed from a material capable of melting in response to an increase in temperature, is arranged between power storage elements (for example, see PTL 2). Meanwhile, use of an inorganic thermal insulation material in a partition member that forms a partition between single batteries has been disclosed (for example, see PTL 3). PTL 1: Japanese Patent Application Publication No. 2013-131428 PTL 2: Japanese Patent Application Publication No. 2010-97693 PTL 3: U.S. Pat. No. 6,146,783

SUMMARY

With regard to the background art mentioned above, the cooling container disclosed in PTL 1 has a structure such that the cooling container splits when a secondary battery reaches an abnormally high temperature and effects cooling by discharging the cooling liquid. In addition, the partition member disclosed in PTL 2 has a structure such that heat from a power storage element is absorbed by heat of dissolution of the meltable base material. However, in cases where cooling by the cooling liquid or heat absorption by the base material is insufficient, it is preferable for the film-like porous body or thermosetting resin to function as a thermal insulation material and insulate from heat from the secondary battery that has reached an abnormally high temperature. However, heat resistance and thermal insulation properties of the film-like porous body and thermosetting resin have not been sufficiently investigated in this background art.

PTL 3 discloses improving thermal insulation properties and flexibility by using an inorganic material as a partition member. However, as a result of investigations by the inventors of the present invention, it was understood that moldability may deteriorate depending on the type of inorganic material, that compressive deformation readily occurs, and that thermal insulation properties may deteriorate at high temperatures even if thermal insulation properties are excellent at normal temperature.

In particular, the following matters have not been taken into account at all in the background art. In some cases, a plurality of secondary batteries that constitute an assembled battery are accommodated in a housing in a state whereby, for example, the secondary batteries are arranged in the thickness direction and pressure is exerted in the thickness direction. In such a case, pressure is also exerted on a partition member sandwiched between secondary batteries or to a partition member arranged between a secondary battery and a member other than the secondary battery. In addition, it is known that secondary batteries expand when charged and discharged and also when exposed to high temperatures, and pressure is exerted on a partition member as a result of expansion of a secondary battery. It is preferable for this type of partition member to be able to maintain an appropriate level of heat resistance and thermal insulation properties even in an environment where pressure is exerted on the partition member.

The purpose of an embodiment of the present invention is to provide a partition member and an assembled battery which can maintain a desired level of heat resistance and thermal insulation properties even in an environment where pressure is exerted.

[1] A partition member that forms a partition between single batteries or between a single battery and a member other than the single battery, wherein the partition member contains a thermal insulation material that contains a powdered inorganic material and a fibrous inorganic material and that has a density of 0.23 to 1.10 g/cm³.

[2] The partition member according to [1], wherein the thermal insulation material is a porous body.

[3] The partition member according to [1] or [2], wherein the powdered inorganic material is at least one selected from among silica particles, alumina particles, calcium silicate particles and vermiculite.

[4] The partition member according to any one of [1] to [3], wherein the fibrous inorganic material is at least one selected from among glass fibers, rock wool, ceramic fibers and biosoluble inorganic fibers.

[5] An assembled battery that includes a plurality of single batteries and the partition member according to any one of [1] to [4].

According to an embodiment of the present invention, a partition member and an assembled battery which is able to maintain a desired level of heat resistance and thermal insulation properties even in an environment where pressure is provided.

DESCRIPTION OF THE PREFERRED EMBODIMENT

Figure 1:
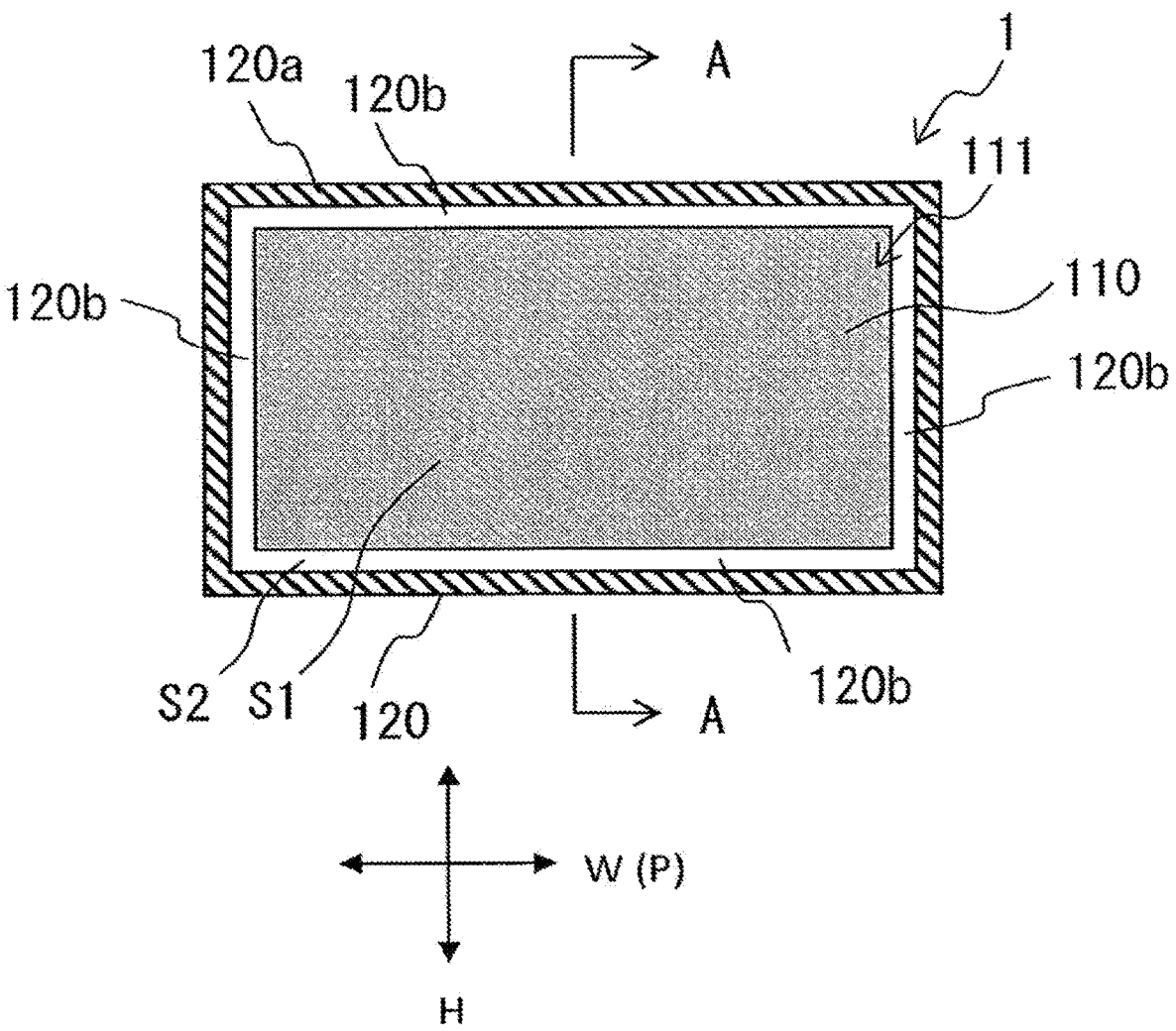
FIG. 1 shows an example of a configuration of the partition member of the present invention.

Embodiments of the present invention will now be explained. Explanations of embodiments shown in the drawings below are merely exemplary, and the present invention is not limited to the configurations shown in the drawings. <Partition Member>

The partition member of the present invention forms a partition between single batteries or between a single battery and a member other than the single battery, wherein the partition member contains a thermal insulation material that contains a powdered inorganic material and a fibrous inorganic material and that has a density of 0.23 to 1.10 g/cm³. In addition, it is preferable for this thermal insulation material to be a porous body and to be capable of holding a liquid. Furthermore, this partition member may comprise only a thermal insulation material as long as a thermal insulation material having the characteristics mentioned above is contained, but in a preferred embodiment thereof, the thermal insulation material is accommodated in an outer package body.

Because the partition member contains the thermal insulation member mentioned above, it is possible to prevent the thermal insulation material from undergoing a significant decrease or loss in heat resistance and thermal insulation properties as a result of pressure exerted on the partition member. That is, because the thermal insulation material of the partition member can maintain the desired heat resistance and thermal insulation properties when subjected to heat from a secondary battery, it is possible to block transfer of heat to other secondary batteries and the like.

Figure 2:
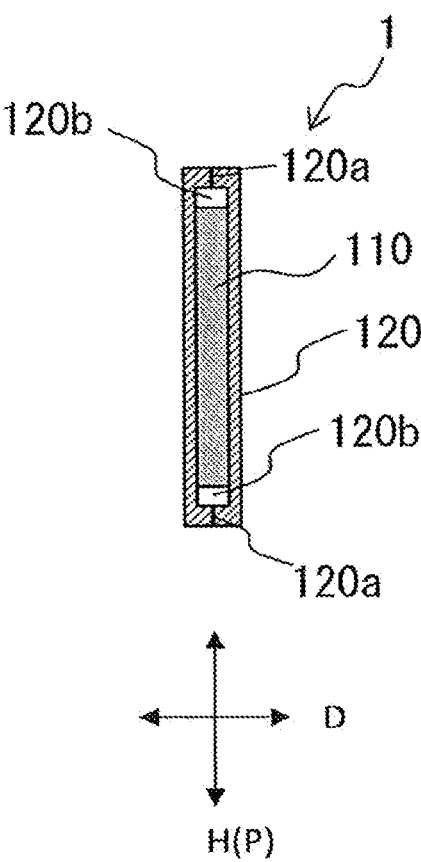
FIG. 2 is a cross-sectional view of a case where the partition member shown in FIG. 1 is cut along the line denoted by A-A.

FIG. 1 shows an example of a configuration of the partition member of the present invention. FIG. 1 shows a frontal view of a partition member 1. FIG. 2 shows a cross section of the right hand side of the partition member shown in FIG. 1 in a case where the partition member is cut along the line denoted by A-A.

In FIG. 1 and FIG. 2, the partition member 1 has an overall plate-like shape or sheet-like shape having a height direction (H), a width direction (W) and a thickness direction (D). The partition member 1 has a thickness direction (D) and a planar direction (P) that is orthogonal to the thickness direction (D). The planar direction (P) includes the height direction (H) and the width direction (D), and a plurality of oblique directions that lie between the height direction (H) and the width direction (D).

The partition member 1 is used to form a partition between single batteries that constitute an assembled battery or between a single battery and a member other than the single battery in the thickness direction (D) of the partition member. The partition member 1 includes a thermal insulation material 110, and preferably includes an outer package body 120 which accommodates the thermal insulation material 110 and can hold a liquid.

[Thermal Insulation Material]

The thermal insulation material 110 includes a powdered inorganic material and a fibrous inorganic material. In the present invention, the term "fibrous inorganic material" means an inorganic material having a shape such that the of long axis is at least 100 times greater than the short axis, and the term "powdered inorganic material" means an inorganic material having a shape such that the long axis is less than 100 times greater than the short axis. Moreover, in the case of a fibrous inorganic material in particular, the term "long axis" means the fiber length and the term "short axis" means the length of a cross section that is orthogonal to the long axis direction.

If the thermal insulation material used in the partition member is constituted only from a powdered inorganic material, the moldability of the thermal insulation material is poor and maintaining the shape of the partition member is difficult, and it therefore becomes essential to fix the partition member using a binder or the like. In cases where this type of partition member is placed in an environment where pressure is exerted, maintaining the shape of the partition member becomes difficult and heat resistance therefore deteriorates.

Meanwhile, if the thermal insulation material used in the partition member is constituted only from a fibrous inorganic material, thermal insulation properties tend to increase as a result of a layer of air in gaps between fibers that constitute the thermal insulation material, but thermal insulation properties deteriorate as a result of thermal radiation at high temperatures. In addition, in cases where the partition member is placed in an environment where pressure is exerted and the partition member is compressed, the problem of compressive deformation tends to occur.

The problem mentioned above can be solved by using a combination of a powdered inorganic material and a fibrous inorganic material in the thermal insulation material used in the partition member of the present invention.

The fibrous inorganic material is, for example, preferably at least one type selected from the group consisting of paper, cotton sheets, polyimide fibers, aramid fibers, polytetrafluoroethylene (PTFE) fibers, glass fibers, rock wool, ceramic fibers and biosoluble inorganic fibers, and among these, at least one type selected from among glass fibers, rock wool, ceramic fibers and biosoluble inorganic fibers is particularly preferred. Ceramic fibers are fibers comprising mainly silica and alumina (silica:alumina=40:60 to 0:100), and more specifically, silica-alumina fibers, mullite fibers and alumina fibers can be used.

In addition, the powdered inorganic material is, for example, preferably at least one type selected from the group consisting of silica particles, alumina particles, calcium silicate, clay minerals, vermiculite, mica, cement, pearlite, fumed silica and aerogel, and among these, at least one type selected from among silica particles, alumina particles, calcium silicate and vermiculite is particularly preferred. Among types of calcium silicate, xonotlite, tobermorite, wollastonite and gyrolite are preferred, and gyrolite is particularly preferred. Gyrolite, which has a floriform structure, exhibits excellent liquid holding properties due to maintaining a porous structure even when subjected to compressive deformation. Principal clay minerals are magnesium silicate (including talc and sepiolite), montmorillonite and kaolinite.

Publicly known materials that satisfy the prescribed density can be selected as the thermal insulation material that contains a fibrous inorganic material and a powdered inorganic material. For example, the thermal insulation material can be selected from among those disclosed in Japanese Patent Application Publication No. 2003-202099.

In order to be lightweight and maintain thermal insulation properties even at high temperatures, a thermal insulation material having a density of 0.23 to 1.10 g/cm$^3$ is used. If the density of the thermal insulation material is not lower than the lower limit mentioned above, many layers of air are present in internal spaces, which is preferable from the perspectives of thermal insulation properties and liquid holding properties, and it is preferable for the density of the thermal insulation material to be not higher than the upper limit mentioned above from the perspective of the degree of deformation when compressed being low. In addition, from these perspectives, the density of the thermal insulation material is preferably at least 0.35 g/cm$^3$, and more preferably at least 0.55 g/cm$^3$, and is preferably not more than 1.05 g/cm$^3$, and more preferably not more than 1.00 g/cm$^3$.

Moreover, it is preferable for the entire thermal insulation material 110 to be formed from a porous body. In the explanations given below, the entire thermal insulation material 110 is formed from a porous body and a liquid is held inside cavities in the porous body. It is preferable for the thermal insulation material 110 to be elastic so as to be able to respond to pressure. However, the thermal insulation material may, in some cases, not be elastic.

[Liquid]

In cases where a liquid is held in a porous body, the liquid used is preferably a liquid having a boiling point of at least 80° C. and not more than 250° C. at normal pressure, and more preferably a liquid having a boiling point of at least 100° C. and not more than 150° C. at normal pressure. Specifically, in addition to water, the liquid used preferably includes at least one type selected from the group consisting of, for example, alcohols, esters, ethers, ketones, hydrocarbons, fluorine-based compounds and silicone-based oils. It is possible to use one of these or a mixture of two or more types thereof. The liquid may contain additives such as substances that impart anti-freeze properties (anti-freeze agents), preservatives and pH-adjusting agents. By imparting anti-freeze properties, it is possible to prevent an outer package body from breaking due to expansion caused by freezing. In addition, by adding a pH-adjusting agent, it is possible to reduce changes in the pH of the liquid caused by components eluting from the powdered inorganic material and reduce degeneration of the powdered inorganic substance, the outer package body and the liquid (water) per se.

Substances incorporated in water are not limited to these, and other substances can be added according to need.

[Outer Package Body]

The outer package body 120 accommodates the liquid and the thermal insulation material 110 in a sealed state. A film or sheet of a resin or metal can be used as the outer package body 120. For example, laminating a thermal insulation material that holds a liquid using a film or sheet obtained by layering a metal and a resin is preferred from the perspectives of obtaining high heat resistance and strength. A laminated body having at least three layers, including a resin layer, a metal layer and a resin sealant layer, is preferred as a laminated body which has a layered structure of a metal and a resin and which is used for the lamination mentioned above. The metal is, for example, an aluminum foil, a copper foil, a tin foil, a nickel foil, a stainless steel foil, a lead foil, a tin-lead alloy foil, a bronze foil, a silver foil, an iridium foil, a phosphor bronze foil, or the like. In particular, an aluminum foil, a copper foil or a nickel foil is preferred, and an aluminum foil is more preferred. The metal is preferably at least one type of metal selected from among those listed above.

In addition, a thermosetting resin and/or a thermoplastic resin can be used as the resin. However, use of a thermoplastic resin is preferred. Examples of resins include polyethylene, polypropylene, polystyrene, nylon resins, acrylic resins, epoxy resins, polyurethanes, polyether ether ketones, polyethylene terephthalate, polyphenylene sulfide, polycarbonates and aramid resins. In particular, the resin is preferably at least one type selected from among polypropylene, nylon resins and polyethylene terephthalate.

The thickness of the outer package body 120 is not particularly limited, but is, for example, 5 to 200 μm. In the case of the layered product mentioned above, the thickness of the metal foil can be 3 to 50 μm and the thickness of the resin layer can be 2 to 150 μm. Due to this configuration, it is possible to ensure that the heat resistance and low water vapor permeability of the metal foil are achieved and possible to improve sealing properties by means of the resin.

In addition, the thermal insulation material 110 is sealed inside the outer package body 120 by joining edge parts of two outer package bodies 120 in a ring-like shape by means of heat sealing, bonding, or the like. Alternatively, the liquid and the thermal insulation material 110 may be sealed by folding one outer package body and bonding the edge part thereof by means of heat sealing, bonding, or the like. The outer package body 120 is preferably flexible (elastic), but may, in some cases, not be flexible.

In the example shown in FIG. 1, the outer package body 120 is provided with a sealing part 120a that seals the edge part of the outer package body, and the thermal insulation material 110 is accommodated in an internal space 111 that is formed in the outer package body 120 by sealing with the sealing part 120a. In the example shown in FIG. 1, a gap 120b is provided in the internal space 111 between the sealing part 120a and the thermal insulation material 110. In other words, in a planar view of the front of the partition member 1, the internal space 111 includes a first region S1 in which the outer package body 120 and the thermal insulation material 110 overlap and a second region S2 in which the outer package body 120 and the thermal insulation material 110 do not overlap. However, the gap 120b is not necessarily essential. The gap 120b may be in a state whereby inner surfaces of the outer package body 120 are in contact with each other in cases where a fluid (a gas or liquid) is not present therein. Moreover, in the present invention, the volume of the internal space 111 is defined as the product of the area of the internal space 111 and the thickness of the thermal insulation material 110. In addition, the position of the thermal insulation material is not necessarily the center of the internal space, and the thermal insulation material is not necessarily parallel to the outer package body.

<Assembled Battery>

An explanation will now be given of an assembled battery in which the partition member 1 is used. Assembled batteries are used in battery packs fitted to, for example, electric vehicles (EV), hybrid electric vehicles (HEV), plug-in hybrid electric vehicles (PHEV), heavy electrical equipment, electric bikes, power-assisted bicycles, ships, aircraft, electric trains, uninterruptible power supplies (UPS), domestic power storage systems, storage battery systems for power system stabilization systems that use renewable energy such as wind power, solar power, tidal power or geothermal energy, and the like. However, assembled batteries can also be used as power sources for supplying electrical power to equipment other than the EVs and the like mentioned above.

[Single Battery]

Figures 3, 4:
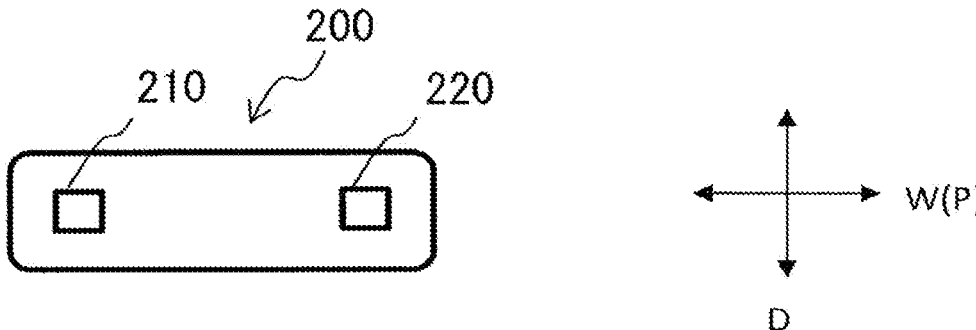
FIG. 3 shows an example of a single battery.
FIG. 4 is a frontal view of the single battery shown in FIG. 3.
Figure 5:
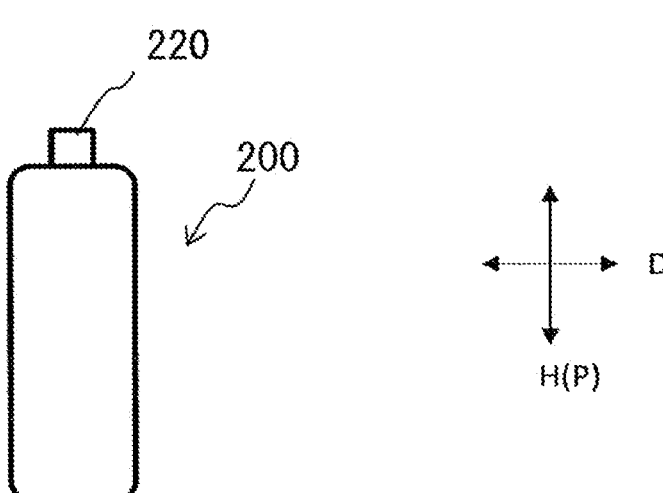
FIG. 5 is a side view of the single battery shown in FIG. 3.

FIG. 3 is a planar view that shows an example of a single battery that constitutes an assembled battery, FIG. 4 is a frontal view of the single battery shown in FIG. 3, and FIG. 5 is a right side view of this single battery. A single battery 200 is formed as a cuboid shape having a height direction (H), a width direction (W) and a thickness direction (D), and a terminal 210 and a terminal 220 are provided on the top surface of the single battery. The single battery 200 is, for example, a lithium ion secondary battery provided with a positive electrode and negative electrode, which are capable of storing and releasing lithium ions, and an electrolyte. In addition to lithium ion secondary batteries, it is possible to use a secondary battery such as a lithium ion all solid state battery, a nickel-metal hydride battery, a nickel-cadmium battery or a lead storage battery.

[Assembled Battery]

Figure 6:
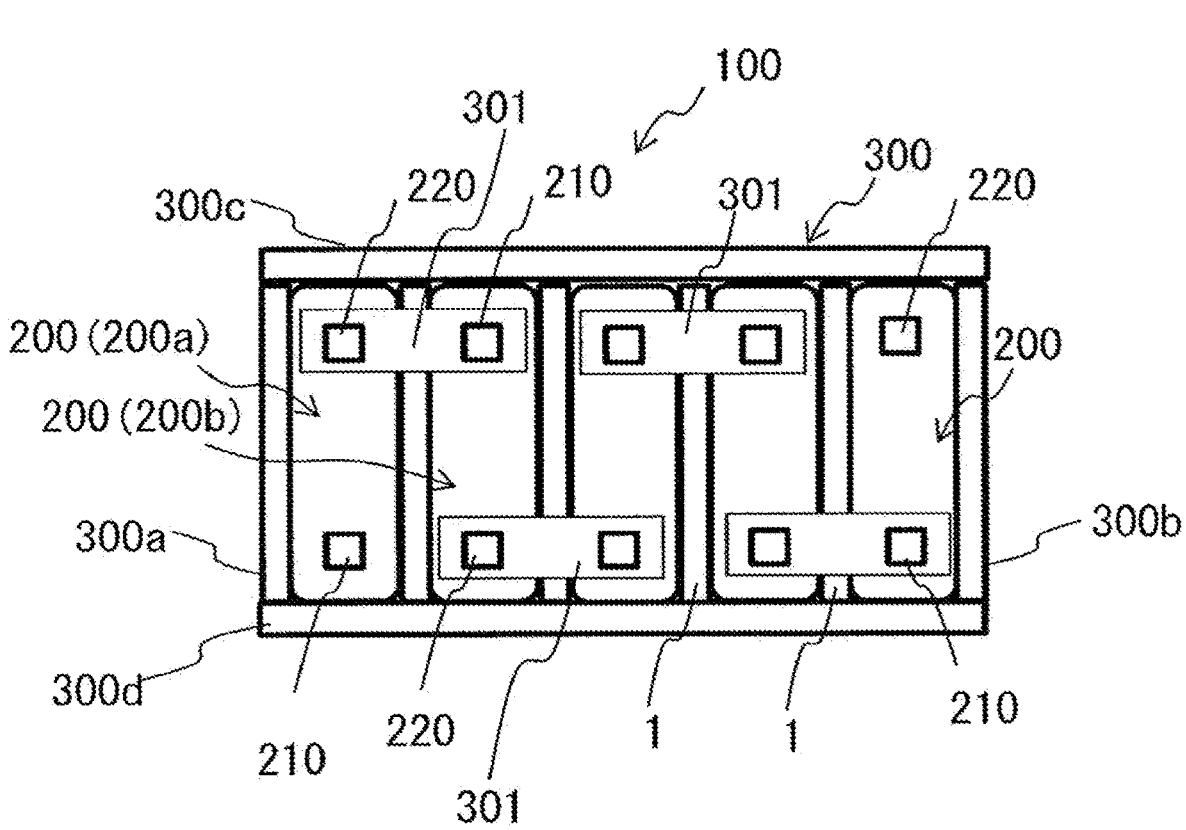
FIG. 6 is a top view that shows an example of an assembled battery.
Figure 7:
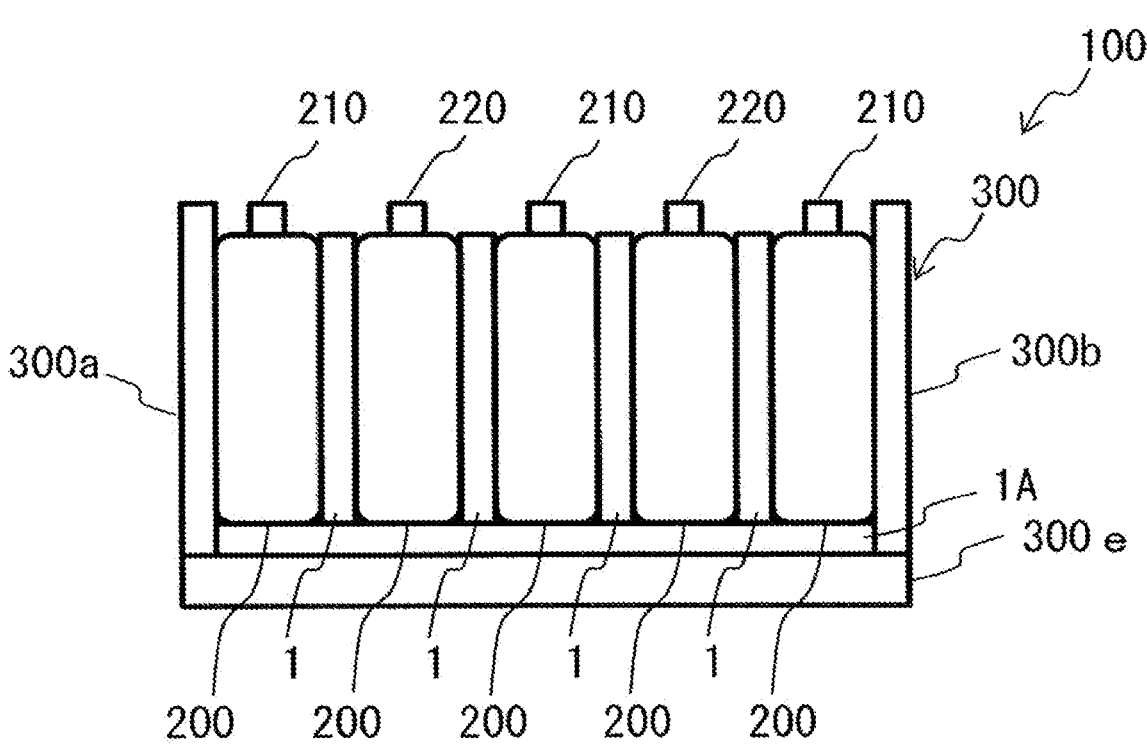
FIG. 7 is a side view that schematically illustrates a side surface of the assembled battery shown in FIG. 6, in a state where a side plate on the front side has been removed.

FIG. 6 shows the top surface of an assembled battery 100 formed using a plurality of single batteries 200, and FIG. 7 is a side view that schematically illustrates a state in which a side plate 300d has been removed from the assembled battery 100 shown in FIG. 6. In FIG. 6 and FIG. 7, the assembled battery 100 includes a housing 300 and a plurality of single batteries 200 accommodated inside the housing 300. The housing 300 has a bottom plate 300e and side plates 300a, 300b, 300c and 300d, which are provided in an upright manner around the periphery of the bottom plate 300e. In FIG. 6 and FIG. 7, five single batteries 200 are used as an example, but the number of single batteries can be selected as appropriate.

The plurality of single batteries 200 are arranged in the thickness direction inside the housing 300, and partition members 1 described above are disposed between single batteries 200. The assembled battery 100 outputs electrical power as a result of positive electrode terminals (for example, terminals 210) and negative electrode terminals (for example, terminals 220) of single batteries 200, which are adjacent to (opposite) each other with the partition member 1 disposed therebetween, being electrically connected in series by means of bus bars 301. A partition member 1A is arranged between the bottom plate 300e of the housing 300 and the single batteries 200 in the assembled battery 100, as shown in FIG. 7. The partition member 1A has a similar configuration to the partition member 1.

<Heat Generation and Heat Transfer in Assembled Battery>

As a result of some or all of the chemical substances that constitute the electrodes, the electrolyte solution, and the like, of a single battery 200 undergoing decomposition reactions as a result of heat generation inside the single battery 200, the temperature of the single battery 200 may increase and some or all of the regions in the single battery 200 may reach a temperature of at least 200° C. In the present invention, this state is referred to as an "abnormal heat generation state".

In general, it is known that among the materials that constitute the single battery 200, the safety of a positive electrode material is greatly affected by the stability of the crystal structure thereof following delithiation caused by charging. Materials such as $LiCoO_2$, $Li(Ni_{1/3}Mn_{1/3}Co_{1/3})O_2$ and $Li(Ni_{0.8}Co_{0.15}Al_{0.05})O_2$, which are commonly used as positive electrode materials, undergo crystal collapse caused by oxygen release at high temperatures in a charged state. Oxygen released from a positive electrode causes oxidation of an electrolyte solution, and the like, and leads to sudden exothermic reactions. It has been reported that as a result of structural analysis using radiant light, phase transition of crystals occurs at temperatures close to 200° C. in the types of positive electrode material mentioned above. Therefore, in cases where the temperature in some or all of the regions in the single battery 200 reach at least 200° C., crystal collapse progresses in a positive electrode, that is to say, the single battery 200 is in a thermal runaway state (see Reference Document 1: (Safety Technologies and Materials for Lithium-ion Batteries), CMC Publishing Co., Ltd., page 44/Reference Document 2: J. Dahn et al., Electrochemistry Communication, 9, pages 2534 to 2540 (2007)/Reference Document 3: Hironori Kobayashi, "*Housya-kou wo Mochiita Lithium ion Niji Denchi You Seikyoku Zairyou no Hyouka-Kaiseki Gijutsu*" (Techniques for evaluation and analysis of positive electrode materials for lithium ion secondary batteries using radiant light), Industrial Users Society of SPring-8, Glass and Ceramics Seminar (2nd) (2011)).

In addition, with regard to the safety of a negative electrode material among the materials that constitute the single battery 200, it is known that a charging negative electrode (a lithium-inserted carbon negative electrode) fundamentally exhibits strong reducing properties similar to those exhibited by lithium metal, and that a coating film is formed on the surface of the negative electrode as a result of a reaction with an electrolyte solution, thereby suppressing further reactions. Therefore, the chemical composition and structure and thermal stability of this protective coating film greatly affect the thermal stability of the charging negative electrode when the temperature increases. It is normally explained that a reaction between a charging negative electrode and an electrolyte solution is caused by formation of a protective coating film and a subsequent explosive reductive decomposition reaction caused by rupture of the coating film. It has been reported that, in general, a protective coating film-forming reaction at a negative electrode progresses from a temperature of approximately 130° C., a subsequent coating film decomposition reaction progresses at a temperature of approximately 200° C., and an explosive reductive decomposition reaction then finally occurs. Therefore, in cases where some or all of the regions in the single battery 200 reach a temperature of at least 200° C., rupture of the coating film at the surface of the negative electrode progresses, that is to say, the single battery 200 is in a state of thermal runaway (see Reference Document 4: "*Denchi Hando Bukku*" (Battery Handbook), Vol. 1, Ohmsha, Ltd., page 591/Reference Document 5: Recent Trends of High Safety and Evaluation Technologies in Lithium-ion Batteries, CMC Publishing Co., Ltd., page 90).

In addition, a state in which chemical substances that constitute the electrodes, the electrolyte solution, and the like, that constitute the single battery 200 have not undergone decomposition reactions caused by at least a certain heat generation rate inside the single battery 200 is referred to as a "normal state" in the present invention. Here, the heat generation state of the single battery 200 can be evaluated using accelerating rate calorimetry (ARC), which is a means for quantitatively measuring thermal behavior when a reactive chemical substance undergoes exothermic decomposition under thermally insulated conditions. For example, Dahn et al. have defined that in cases where the heat generation rate observed in ARC exceeds 0.04° C./min, an auto-exothermic reaction progresses inside a cell, and it is possible to follow this definition (see Reference Document 6: J. Dahn et al., Electrochimica Acta, 49, pages 4599 to 4604 (2004)). In addition, in the present invention, a single battery 200 in a normal state is said to be "a single battery in which a normal state is maintained", and a single battery 200 which has deviated from a normal state and has not reached abnormal heat generation state is said to be "a single battery that has deviated from a normal state". Heat generated inside a single battery 200 is transmitted to other single batteries 200 via a variety of transmission pathways. For example, heat generated inside a single battery 200 can be transmitted to other single batteries 200 via the partition member 1.

For example, the envisaged upper limit for the average surface temperature is 180° C. in cases where a single battery 200 in contact or near-contact with the partition member 1 deviates from a normal state and has not reached an abnormal heat generation state. Here, in cases where commonly used separator materials are made of polyethylene or polypropylene, it is known that the meltdown temperature thereof is 160° C. to 200° C. Therefore, in cases where the average surface temperature of a single battery 200 exceeds 180° C., there are concerns that a part of a commonly used separator material that constitutes the single battery 200 will undergo meltdown and the single battery will reach an abnormal heat generation state.

In a region where the average temperature of one of the two surfaces in the thickness direction of a partition member 1 that forms a partition between single batteries 200 that constitute the assembled battery 100 does not exceed 100° C., the partition member 1 can transmit heat from a single battery 200 (for example, a single battery 200a) in the assembled battery 100 in the thickness direction, and transmit the heat to another single battery 200 (for example, a single battery 200b) or a member other than the single battery 200 (for example, the bottom plate 300e) that faces the single battery 200a through the partition member 1. However, in a case where the average temperature exceeds 100° C., the partition member 1 splits as a result of heat, and a liquid held inside is discharged to the outside in the form of a gas or a liquid. As a result of this discharge, air (which exhibits a thermal insulation effect) enters the thermal insulation material 110 in the partition member 1, thereby increasing thermal insulation properties (thermal resistance) in the thickness direction. As a result, it is possible to avoid a state in which a given single battery 200 reaching a state that deviates from a normal state leads to another single battery 200 reaching a state that deviates from a normal state.

The envisaged upper limit for the average surface temperature is normally 80° C. in cases where a single battery

200 in contact or near-contact with the partition member 1 does not deviate from a normal state. Here, the boiling points of commonly used electrolyte solution components are at least 90° C., as shown in Table 1 below. Commonly used electrolyte solution components are, for example, ethylene carbonate (EC), diethyl carbonate, dimethyl carbonate (DMC) and ethyl methyl carbonate (EMC). In cases where the average surface temperature of a single battery 200 is lower than 80° C., a commonly used electrolyte solution per se that constitutes the single battery 200 does not boil. In cases where the average temperature of both surfaces in the thickness direction of the partition member 1 that forms a partition between single batteries that constitute the assembled battery is lower than 80° C., heat transfer in the thickness direction is facilitated by the liquid held inside. Because the heat transfer resistance of the partition member 1 is lower than that of conventional products in cases where all the single batteries 200 that constitute the assembled battery 100 are in a normal state, it is possible to equalize the temperature between single batteries 200 in the assembled battery 100, and an advantageous effect of reducing degradation of single batteries 200 caused by temperature differences can be expected.

[Table 1]

Working Examples relating to the present invention will now be explained.

Working Example 1

A vermiculite paper (a porous body having a height of 50 mm, a width of 50 mm, a thickness of 2 mm and a density of 0.85 g/cm$^3$ and containing vermiculite (a powdered inorganic material) and glass fibers (a fibrous inorganic material)) was prepared as a thermal insulation material 110.

(1) Measurement of Normal Temperature Thermal Conductivity

Using the thermal insulation material described above, a heater, a brass plate, a thermal insulation plate A (HIPHA available from Misumi Group Inc., thickness 10 mm), a brass plate, a porous body, a brass plate, thermal insulation plate A, a brass plate and a thermal insulation plate B (HIPHA available from Misumi Group Inc., thickness 40 mm) were held and bonded in that order, with the aforementioned thermal insulation material being used as a partition member. The load was adjusted to 375 kg (corresponding to 15 kgf/cm$^2$) from the upper side of thermal insulation plate B using a hydraulic press HYP505H (available from Japan Automatic Machine Co., Ltd.).

With the above-mentioned load applied, the heater temperature was increased to 80° C., and once the heater temperature reached 80° C., this temperature was maintained for 30 minutes. Following completion of the heating, the thickness of the thermal insulation material (partition member) (termed the "film thickness") was measured, and it was determined that the film thickness while compressed was 1.8 mm. From the temperatures at various positions when the heating was completed, heat conduction resistance from the heater to the thermal insulation material, and the film thickness of the thermal insulation material while compressed, the normal temperature thermal conductivity $k_L$ of the thermal insulation material was determined using the formula below.

$$k_L = (\Delta T1 \times L)/(\Delta T2 \times R)$$

$k_L$: Thermal conductivity [W/(m·K)] of thermal insulation material $\Delta T1$: Temperature difference [K] between high temperature side surface and low temperature side surface of thermal insulation plate A $\Delta T2$: Temperature difference [K] between high temperature side surface and low temperature side surface of thermal insulation material L: Film thickness [m] of thermal insulation material while compressed R: Heat conduction resistance from heater to thermal insulation material $6.8 \times 10^{-3}$ [m²·K/W]

The thermal conductivity $k_L$ 30 minutes after the heater reached 80° C. was 0.08 W/(m·K).

(2) Measurement of High Temperature Thermal Conductivity

Using a similar thermal insulation material to that used in the normal temperature thermal conductivity measurements described above, a heater, two brass plates (of the same type), the thermal insulation material, a brass plate, thermal insulation plate A, a brass plate and thermal insulation plate B were overlaid from below in that order and bonded, with the aforementioned thermal insulation material being used as a partition member. The load was adjusted to 375 kg (corresponding to 15 kgf/cm²) from the upper side of thermal insulation plate B using a hydraulic press.

With the above-mentioned load applied, the heater temperature was increased to 600° C., and once the heater temperature reached 600° C., this temperature was maintained for 1 hour. Following completion of the heating, the film thickness of the thermal insulation material (partition member) was measured, and it was determined that the film thickness while compressed was 1.9 mm. From the temperatures at various positions when the heating was completed, heat conduction resistance from the heater to the thermal insulation material, and the film thickness of the thermal insulation material while compressed, the thermal conductivity $k_H$ of the thermal insulation material was determined using the formula below.

$$k_H = (\Delta T3/R - q) \times L/\Delta T4 \qquad \text{(formula)}$$

$k_H$: Thermal conductivity [W/(m·K)] of thermal insulation material $\Delta T3$: Temperature difference [K] between high temperature side surface and low temperature side surface of thermal insulation plate A $\Delta T4$: Temperature difference [K] between high temperature side surface and low temperature side surface of thermal insulation material L: Thickness (film thickness) [m] of thermal insulation material while compressed R: Heat conduction resistance from heater to thermal insulation material $1.65 \times 10^{-4}$ [m²·K/W]

q: Heat loss due to convection and radiation from brass plates and thermal insulation materials $1.35 \times 10^4$ [W/m²]

In the formula above, the high temperature side surface is the surface on the side close to the heater, and the low temperature side surface is the opposite surface from the heater. The thermal conductivity $k_H$ 1 hour after the heater reached 600° C. was 0.08 W/(m·K).

Working Example 2

Tests were carried out in the same way as in Working Example 1, except that a thermal insulation sheet having a thickness of 2 mm (a porous body having a density of 0.95 g/cm³ and containing wollastonite (a powdered inorganic material) and rock wool (a fibrous inorganic material)) was used instead of the vermiculite paper used in Working Example 1. In Working Example 2, the film thickness while compressed in normal temperature thermal conductivity measurements was 1.8 mm, and the film thickness while compressed in high temperature thermal conductivity measurements was 1.9 mm.

Working Example 3

Tests were carried out in the same way as in Working Example 1, except that a material obtained by overlaying two sheets of a calcium silicate paper having a thickness of 1 mm (a porous body having a density of 0.38 g/cm³ and containing calcium silicate (a powdered inorganic material) and rock wool (a fibrous inorganic material)) was used instead of the vermiculite paper used in Working Example 1. In Working Example 3, the film thickness while compressed in normal temperature thermal conductivity measurements was 1.9 mm, and the film thickness while compressed in high temperature thermal conductivity measurements was 1.7 mm.

Working Example 4

Tests were carried out in the same way as in Working Example 1, except that a material obtained by overlaying two sheets of a calcium silicate paper having a thickness of 1 mm (a porous body having a density of 0.25 g/cm³ and containing calcium silicate and rock wool) was used instead of the vermiculite paper used in Working Example 1. In Working Example 4, the film thickness while compressed in normal temperature thermal conductivity measurements was 1.7 mm, and the film thickness while compressed in high temperature thermal conductivity measurements was 1.6 mm.

Comparative Example 1

Tests were carried out in the same way as in Working Example 1, except that a material obtained by overlaying four sheets of a glass fiber paper containing vermiculite and having a thickness of 0.6 mm (a porous body having a density of 0.22 g/cm³) was used instead of the vermiculite paper used in Working Example 1. In Comparative Example 1, the film thickness while compressed in normal temperature thermal conductivity measurements was 1.4 mm, and the film thickness while compressed in high temperature thermal conductivity measurements was 1.6 mm.

Comparative Example 2

Tests were carried out in the same way as in Working Example 1, except that a material obtained by overlaying three sheets of a rock wool paper containing vermiculite and having a thickness of 0.9 mm (a porous body having a density of 1.16 g/cm³) was used instead of the vermiculite paper used in Working Example 1. In Comparative Example 2, the film thickness while compressed in normal temperature thermal conductivity measurements was 2.0 mm, and the film thickness while compressed in high temperature thermal conductivity measurements was 2.0 mm.

Comparative Example 3

Tests were carried out in the same way as in Working Example 1, except that a material obtained by overlaying four sheets of a glass fiber paper having a thickness of 0.6 mm (a porous body having a density of 0.125 g/cm³) was used instead of the vermiculite paper used in Working Example 1. In Comparative Example 3, the film thickness while compressed in normal temperature thermal conductivity measurements was 1.4 mm, and the film thickness while compressed in high temperature thermal conductivity measurements was 1.4 mm.

Comparative Example 4

A vermiculite powder (containing no fibrous inorganic material) was used instead of the vermiculite paper used in Working Example 1. Because moldability was poor and the shape collapsed when the vermiculite powder was used in isolation, tests were carried out in the same way as in Working Example 1, except that a material (having a thickness of 2 mm and a density of 0.6 g/cm³) obtained by incorporating a vermiculite powder in a laminated aluminum film (comprising polyethylene (inside), aluminum and polyethylene terephthalate (outside) and having a thickness of 0.15 mm) was used. In Comparative Example 4, the film thickness while compressed in normal temperature thermal conductivity measurements was 1.7 mm, and the film thickness while compressed in high temperature thermal conductivity measurements was 1.8 mm.

Comparative Example 5

Tests were carried out in the same way as in Working Example 1, except that a vermiculite paper having a thickness of 1.8 mm (a porous body having a density of 1.56 g/cm³ and containing vermiculite and glass fibers) was used instead of the vermiculite paper used in Working Example 1. In Comparative Example 5, the film thickness while compressed in normal temperature thermal conductivity measurements was 1.8 mm, and the film thickness while compressed in high temperature thermal conductivity measurements was 1.8 mm.

The density and thermal conductivity values for Working Examples 1 to 4 and Comparative Examples 1 to 5 are shown in Table 2 below.

[Table 2]

Table 2 shows the relationship between the density and thermal conductivity of the thermal insulation materials used in the partition members obtained in the tests set forth in Working Examples 1 to 4 and Comparative Examples 1 to 5. From the results of the tests, it can be understood that the partition member of the present invention, in which a combination of a powdered inorganic material and a fibrous inorganic material was used, exhibited lower high temperature thermal conductivity and better high temperature thermal insulation properties than Comparative Examples 3 and 4. In addition, from the results of the tests, it can be understood that a member corresponding to the partition member of the present invention in particular exhibited lower high temperature thermal conductivity and better high temperature thermal insulation properties than Comparative Example 1, in which a thermal insulation material having a density of 0.22 g/cm³ was used as a partition member, Comparative Example 2, in which a thermal insulation material having a density of 1.16 g/cm³ was used as a partition member, and Comparative Example 5, in which a thermal insulation material having a density of 1.56 g/cm³ was used as a partition member. Therefore, by using a porous body which contains a powdered inorganic material and a fibrous inorganic material and which has a density of at least 0.23 g/cm³ and not more than 1.10 g/cm³ in the thermal insulation material 110, it is possible to obtain a thermal insulation material 110 that exhibits favorable heat resistance and thermal insulation properties at temperatures whereby a secondary battery deviates from a normal state even if placed in an environment where pressure is applied.

Moreover, features mentioned above may be combined as appropriate as long as these do not deviate from the purpose of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

TABLE 1

| | | EC | DMC | EMC | DEC |
|---|---|---|---|---|---|
| DENSITY | g/ml | 1.385 | 1.063 | 1.007 | 0.97 |
| MOLECULAR WEIGHT | g/mol | 88.06 | 90.08 | 104.11 | 118.13 |
| BOILING POINT | ° C. | 238 | 90 | 108 | 127 |

TABLE 2

| | THERMAL INSULATION MATERIAL | | | THERMAL | |
| | POWDERED INORGANIC MATERIAL | FIBROUS INORGANIC MATERIAL | DENSITY [g/cm³] | CONDUCTIVITY [W/(m · K)] | |
| | | | | $K_L$ | $K_H$ |
|---|---|---|---|---|---|
| EXAMPLE 1 | VERMICULITE | GLASS FIBERS | 0.85 | 0.08 | 0.08 |
| EXAMPLE 2 | WOLLASTONITE | ROCK WOOL | 0.95 | 0.09 | 0.1 |
| EXAMPLE 3 | CALCIUM SILICATE | ROCK WOOL | 0.38 | 0.05 | 0.07 |
| EXAMPLE 4 | CALCIUM SILICATE | ROCK WOOL | 0.25 | 0.04 | 0.09 |
| COMPARATIVE EXAMPLE 1 | VERMICULITE | GLASS FIBERS | 0.22 | 0.04 | 0.18 |
| COMPARATIVE EXAMPLE 2 | VERMICULITE | ROCK WOOL | 1.16 | 0.16 | 0.14 |
| COMPARATIVE EXAMPLE 3 | NONE | GLASS FIBERS | 0.13 | 0.03 | 0.19 |

TABLE 2-continued

| | THERMAL INSULATION MATERIAL | | | THERMAL CONDUCTIVITY [W/(m · K)] | |
| | POWDERED INORGANIC MATERIAL | FIBROUS INORGANIC MATERIAL | DENSITY [g/cm³] | $K_L$ | $K_H$ |
|---|---|---|---|---|---|
| COMPARATIVE EXAMPLE 4 | VERMICULITE | NONE | 0.6 | 0.12 | 0.23 |
| COMPARATIVE EXAMPLE 5 | VERMICULITE | GLASS FIBERS | 1.56 | 0.08 | 0.12 |

What is claimed is:

1. A partition member that has a thickness direction and a planar direction that is orthogonal to the thickness direction, and that forms a partition between single batteries in the thickness direction, comprising:

a thermal insulation material that contains a powdered inorganic material and a fibrous inorganic material and that has a density of 0.23 g/cm³ to 1.10 g/cm³; and an outer package body housing, in a sealed state, the thermal insulation material and a liquid having a boiling point from 80° C. to 250° C., wherein the outer package body includes a sealing region, wherein the thermal insulation material is a porous body, and the liquid is held inside cavities in the porous body, wherein the partition member, in a planar view of the thickness direction of the partition member, includes a first region S1 in which the outer package body and the thermal insulation material overlap and a second region S2 in which the outer package body and the thermal insulation material do not overlap, wherein the second region S2 is a gap provided between the first region S1 and the sealing region, and wherein each of the sealing region and the second region S2 extend around an entire perimeter of the first region S1.

2. The partition member according to claim 1, wherein the powdered inorganic material is at least one selected from among alumina particles, calcium silicate particles and vermiculite.

3. The partition member according to claim 1, wherein the fibrous inorganic material is at least one selected from among glass fibers, rock wool, ceramic fibers and biosoluble inorganic fibers.

4. An assembled battery that includes a plurality of single batteries and one or more partition members, each of which is recited in claim 1, wherein outer packages included in each of the plurality of partition members contact with the plurality of single batteries, and wherein at least one of the one or more partition members contact with two single batteries among the plurality of single batteries in a thickness direction thereof.

5. The partition member according to claim 1, wherein the thermal insulation material consists essentially of the powdered inorganic material and the fibrous inorganic material.

6. The partition member according to claim 1, wherein flowing of the liquid out of the partition member increases the thermal insulation of the partition member.

7. The partition member according to claim 1, wherein the liquid includes water.

* * * * *